United States Patent Office 2,816,834
Patented Dec. 17, 1957

2,816,834

PROCESS FOR THE PREPARATION OF SYNTHETIC CHOCOLATE AND THE RESULTING PRODUCT

Simon L. Ruskin, New York, N. Y.

No Drawing. Application February 4, 1955,
Serial No. 486,294

14 Claims. (Cl. 99—14)

The invention relates to chemical compositions, and especially to compositions having the flavor of chocolate.

The primary object of the invention is to provide a material having the same flavor as natural chocolate.

Another object of the invention is to produce a chocolate-like material whose properties can be varied for different uses.

A further object of the invention is to provide a substance having the flavor of chocolate which is not allergenic.

This application is a continuation-in-part of my prior applications Serial No. 606,877, filed July 24, 1945, now abandoned, and Serial No. 438,338, filed June 21, 1954, now abandoned.

I have found it possible to combine essential nutritional elements with the elements of protein hydrolysates such as amino acids and small peptides in such a way that physiological enzymes and coenzymes may be formed. It is thus possible to produce compositions resembling in flavor and in nutritional properties natural substances such as chocolate, coffee, maple syrup and the like.

I have found that such substances as chocolate derive their flavor and nutritional qualities from the combination of amino acids, particularly lysine and methionine, with the alkaloidal and other compounds which are present in small amounts.

I have found that a nonamine substance such as furfural influences the taste of the alkaloid and brings out particularly a balance of taste stimulation producing the characteristic taste of chocolate. The furfural material that best tends to produce this unique effect is a combination of hydroxymethyl furfural and mercaptofurfural. Both of these latter substances can be produced by chemical reaction between certain reagents. By causing furfuryl alcohol to react with a casein hydrolysate containing methionine, small amounts of mercaptofurfural are formed. This in combination with the hydroxy methyl furfural formed during the heating of certain sugar components to 130° C. provides the chocolate aroma while the total reaction of the substances employed completes the flavor and characteristic tactual effects of chocolate.

To practice my invention, I proceed with the following steps. I homogenize a mixture of sucrose, cocoa butter or fat of plant or animal origin, milk and starch, preferably soluble starch or starch that is essentially of the cross linked rather than the linear variety. The cross linked starch gives a more brittle composition and I have found that it is useful in preparation of natural chocolate as well as the synthetic. These four components are gently warmed to melt the fat and then homogenized.

I proceed now to make a solution containing theobromine, lysine, methionine, furfuryl alcohol and casein hydrolysate, preferably an acid hydrolysate produced in the manner shown in my prior application Serial No. 438,338, referred to above. This solution is stirred and heated to 40° C. and under stirring added to the homogenate previously prepared. The whole is now homogenized and then heated in an oil bath to 130-150° C. until the deep brown color characteristic of chocolate is obtained. During the heating the characteristic aroma of the chocolate becomes increasingly apparent. The depth of the flavor can be modified by altering the amount of lysine and methionine in the casein hydrolysate as well as the amount of furfuryl alcohol.

On cooling the mass solidifies and excess oil that is uncombined is decanted. The cooling is allowed to proceed to 30° C. and then the material is brought up to 32° C. at which temperature it is stored. During the cooling period, while the mass is still plastic, vitamin C may be stirred in until it is well mixed. The calcium salt is the preferred form of vitamin C.

Instead of a casein hydrolysate, a pooled hydrolysate of either soy bean, yeast or meat or mixed protein from food wastes, may be used. The important element is that the hydrolysate contains peptides of 500 to 10,000 molecular weight, and preferably around 1,000 molecular weight, since it is these small peptides that offer the best opportunity for the chemical reactions between the sugar and proteins forming the rich brown color of the chocolate. This peptide-sugar reaction I have described in my earlier application Serial No. 438,338, referred to above.

To practice my invention, I conduct the following procedure although I am not limiting myself either by the sequence of the steps or the quantities of materials.

*Example I*

45 grams of sucrose is added to 35 grams of cocoa butter, 5 grams of milk and 5 grams of cross linked starch. The whole is warmed until the cocoa butter melts and the mass is stirred and homogenized for ten minutes. This is set aside as fraction I.

0.180 gram of theobromine alkaloid is added to 1 cc. of furfuryl alcohol to which is added 10 cc. of casein hydrolysate (acid hydrolysed) containing peptides having a molecular weight of around 1,000. The solution is stirred and heated to 40° C. This constitutes fraction II.

Fractions I and II are now thoroughly stirred and the slurry is heated on an oil bath to 130° for 20 minutes until a rich brown color and chocolate flavor is produced. On cooling the slurry solidifies to a gummy mass which hardens to a brittle cake of chocolate.

*Example II*

The procedure is the same as in Example I except that 100 mg. of lysine and 100 mg. of methionine are added also to fraction I.

The astringent effect known to exist in natural chocolate may be achieved, and bactericidal growth simultaneously inhibited, by adding phenol in an amount of 0.1% to 0.2% to the protein hydrolysate.

This synthetic chocolate can be used as an energy supplement for aviators using controlled amounts of theobromine, or caffeine may be substituted for the theobromine while retaining the chocolate taste. The chocolate flavor comes primarily from the furfuryl complexes formed between the furfuryl alcohol and the methionine and cysteine or cystine in the amino acid hydrolysate. A further source of the furfuryl compounds is the reaction between the amino acids and the sugar during heating to 130° when some of the sugar goes to form a furfuryl compound, possibly hydroxy methyl furfural.

The furfurals tend to be vaso dilators, particularly cerebral vaso dilators, and during sudden drops in elevation during airplane flights cerebral vaso constriction occurs which could be counteracted by the material produced in this way. In fact, the composition of this material can be adjusted to supply a fixed dose of either alkaloid or furfuryl complex.

Such synthetic chocolate offers the opportunity of making scientific foods for specified uses. Specific amounts of antihistamine substances, particularly those having amino ethanol compositions, may be added, whereby seasickness or air motion sickness can be avoided by persons eating the chocolate.

The sugar content of the composition tends to overcome hypoglycaemia, that is, low blood sugar which comes with fatigue. To enhance this effect still further, glycine and ascorbic acid may be added in amounts sufficient to give a balanced elevation of blood sugar. Thus I may add 5 grams of glycine to each 100 grams of protein hydrolysate used and 1 gram of calcium ascorbate to the cholocate mix during the cooling period.

The chocolate flavored material produced in accordance herewith is also non allergenic. It is commonly known that chocolate made from the cocoa bean frequently induces allergic reactions in persons who are allergy sensitive. This allergic reaction is due to the protein elements of the chocolate to which the individual becomes sensitized so that on subsequent ingestion the patient suffers an alergic reaction. I have found that proteins which are incomplete in their amino acid composition are incapable of inducing allergic sensitization. Thus, if the amino acid tryptophane is destroyed during protein hydrolysis, the resultant hydrolysate is non allergenic. This may be accomplished by acid or alkaline hydrolysis, but is not accomplished by enzymatic hydrolysis. Thus, when a non allergenic chocolate flavor is desired, I use an acid or alkaline hydrolysate of casein but not the enzymatic hydrolysate.

In fact, such synthetic chocolate can be employed as a therapeutic agent of high nutritional value for severely allergic patients.

A still further addition which can be made in order to increase the nutritional value is dehydroascorbic acid or 2-keto-laevo-gulonic acid instead of ascorbic acid since ascorbic acid itself becomes oxidized to the reversible dehydroascorbic by the heating process and the dosage of ascorbic acid can thus be poorly standardized. I have found that dehydroascorbic acid and 2-keto-laevo-gulonic acid or their salts, either the alkali, alkaline earth or metal salts, may readily be included on such synthetic chocolate and yield antiscorbutic protection after conversion in the body. In the case of the metal salts of 2-keto-laevo-gulonic acid and the dehydroascorbic acid great stability is obtained both on exposure to air and long storage, thus obviating one of the disadvantages of ascorbic acid. I prefer to add the calcium salt of 2-keto-laevo-gulonic or dehydroascorbic acid.

I have also discovered that material produced according to the invention has bacteriostatic properties and when admixed with milk will keep the milk sweet for as long as six weeks.

While I have described herein some embodiments of my invention, I wish it to be understood that I do not intend to limit myself thereby except within the scope of the claims hereto or hereinafter appended.

I claim:

1. Method of producing a nutritional composition which comprises heating together to react a furfuryl compound, a sugar and a protein hydrolysate containing peptides of molecular weight within the range of 500 to 10,000 at a temperature and for a time sufficient to develop a chocolate aroma and flavor.

2. Method of producing a nutritional composition which comprises heating together to react a furfuryl compound, an amino acid, a sugar and a protein hydrolysate containing peptides of molecular weight within the range of 500 to 10,000 at a temperature and for a time sufficient to develop a chocolate aroma and flavor.

3. Method of producing a nutritional composition which comprises heating together to react a furfuryl compound, an amino acid, an alkaloid, a sugar and a protein hydrolysate containing peptides of molecular weight within the range of 500 to 10,000 at a temperature and for a time sufficient to develop a chocolate aroma and flavor.

4. Method of producing a nutritional composition which comprises heating together to react a furfuryl compound, a sugar and a casein hydrolysate containing peptides of molecular weight within the range of 500 to 10,000 at a temperature and for a time sufficient to develop a chocolate aroma and flavor.

5. Method of producing a nutritional composition which comprises heating together to react a furfuryl compound, a sugar and an acid casein hydrolysate containing peptides of molecular weight within the range of 500 to 10,000 at a temperature and for a time sufficient to develop a chocolate aroma and flavor.

6. Method of producing a nutritional composition which comprises heating together to react a furfuryl compound, cross linked starch, a sugar and a protein hydrolysate containing peptides of molecular weight within the range of 500 to 10,000 at a temperature and for a time sufficient to develop a chocolate aroma and flavor.

7. Method of producing a nutritional composition which comprises heating together to react a furfuryl compound, at least one substance selected from the group consisting of theobromine and caffeine, a sugar and a protein hydrolysate containing peptides of molecular weight within the range of 500 to 10,000 at a temperature and for a time sufficient to develop a chocolate aroma and flavor.

8. Method of producing a nutritional composition which comprises heating together to react a furfuryl compound, at least one substance selected from the group consisting of theobromine and caffeine, at least one substance selected from the group consisting of methionine and lysine, a sugar and a protein hydrolysate containing peptides of molecular weight within the range of 500 to 10,000 at a temperature and for a time sufficient to develop a chocolate aroma and flavor.

9. Method of producing a nutritional composition which comprises heating together to react a furfuryl compound, at least one substance selected from the group consisting of theobromine and caffeine, a sugar, and a casein hydrolysate containing peptides of molecular weight within the range of 500 to 10,000 at a temperature and for a time sufficient to develop a chocolate aroma and flavor.

10. Method of producing a nutritional composition which comprises heating together to react a furfuryl compound, at least one substance selected from the group consisting of theobromine and caffeine, at least one substance selected from the group consisting of methionine and lysine, a sugar, and a casein hydrolysate containing peptides of molecular weight within the range of 500 to 10,000 at a temperature of a least 130° C. and for a time sufficient to develop a chocolate aroma and flavor in said composition.

11. The reaction product resulting from heating together a furfuryl compound, a sugar and a protein hydrolysate containing peptides of molecular weight within the range of 500 to 10,000, said product heated at a temperature and for a time sufficient to develop the aroma and flavor of chocolate therein.

12. The reaction product resulting from heating together a furfuryl compound, a sugar, and a casein hydrolysate containing peptides of molecular weight within the range of 500 to 10,000, said product heated at a temperature and for a time sufficient to develop the aroma and flavor of chocolate therein.

13. The reaction product resulting from heating together a furfuryl compound, a sugar, at least one substance selected from the group consisting of theobromine and caffeine, and a protein hydrolysate containing peptides of molecular weight within the range of 500 to 10,000, said product heated at a temperature and for a time sufficient to develop the aroma and flavor of chocolate therein.

14. The reaction product resulting from heating together a furfuryl compound, a sugar, at least one substance selected from the group consisting of theobromine and caffeine, at least one substance selected from the group consisting of methionine and lysine, and a protein hydrolysate containing peptides of molecular weight within the range of 500 to 10,000, said product heated at a temperature and for a time sufficient to develop the aroma and flavor of chocolate therein.

References Cited in the file of this patent

UNITED STATES PATENTS

| | | |
|---|---|---|
| 1,617,412 | Miner | Feb. 15, 1927 |
| 2,103,495 | Ruckdeschel | Dec. 28, 1937 |

OTHER REFERENCES

"Advances in Protein Chemistry," Anson et al., vol. VIII, Academic Press, Inc., New York, N. Y., 1953, page 4.

"The Structure and Composition of Foods," by Winton et al., vol. IV John Wiley & Sons, Inc., New York, 1939, page 124.